Feb. 26, 1963 W. L. BEAR 3,078,826
BIRD HOUSE
Filed Dec. 13, 1960
FIG 1
FIG 2
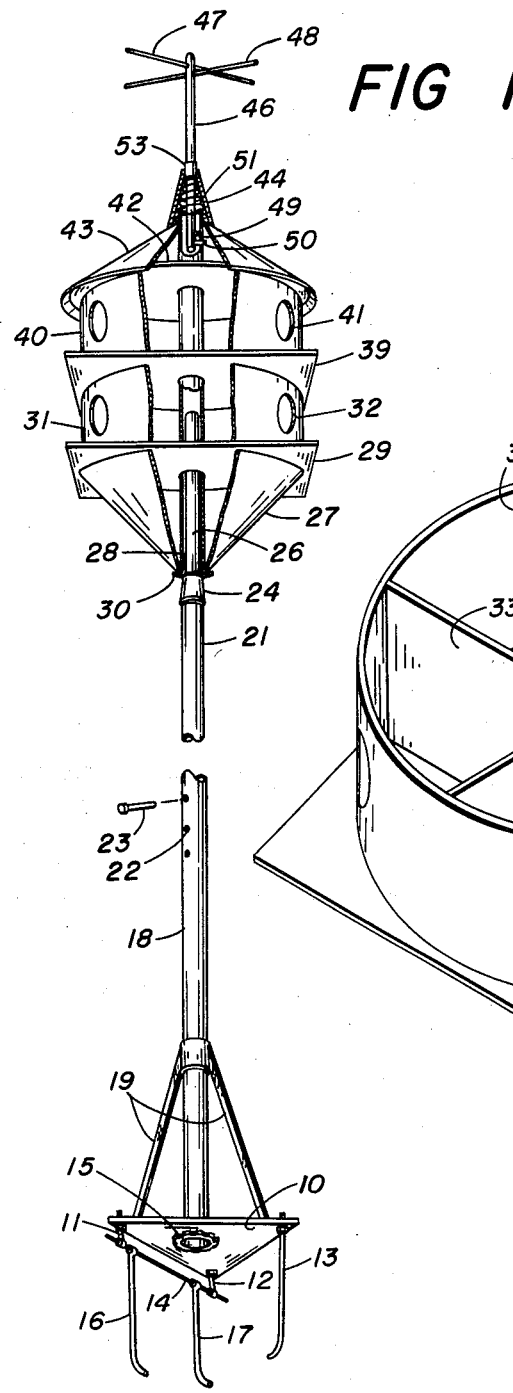
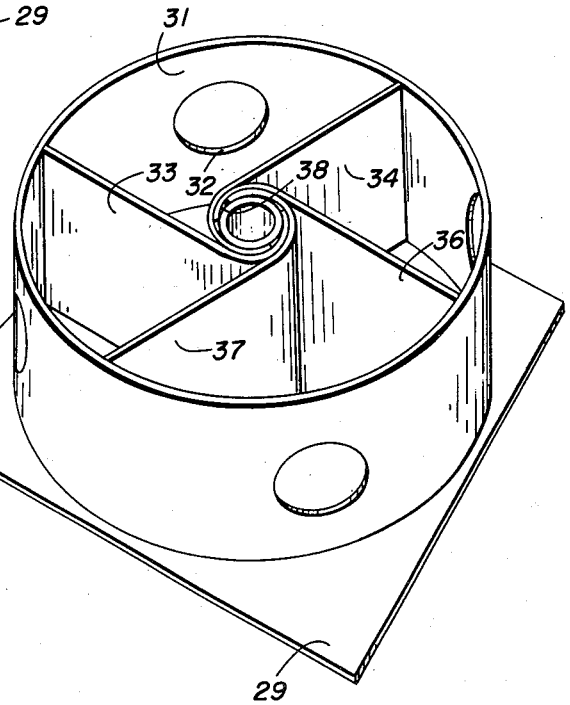
INVENTOR.
WILLIAM LOREN BEAR
BY
ATTORNEY

United States Patent Office 3,078,826
Patented Feb. 26, 1963

3,078,826
BIRD HOUSE
William Loren Bear, 1293 34th St. NE.,
Cedar Rapids, Iowa
Filed Dec. 13, 1960, Ser. No. 75,582
5 Claims. (Cl. 119—23)

This invention relates in general to bird houses and in particular to an easily mountable bird house that can be quickly installed.

Birds are wonderful pets and many people like to have them living around their homes.

It is an object of this invention to provide an improved bird house that can be easily and quickly installed.

Another object of this invention is to provide a bird house than can be easily enlarged to facilitate more birds.

A feature of the invention is found in the provision for a pole upon which are mounted sections that serve as bird houses and which can be stacked to provide layers of such houses on top of each other.

Further objects, features and advantages will become apparent from the following description and claims when read in view of the drawings, in which:

FIGURE 1 is a partially cutaway view of the bird house structure according to this invention, and;

FIGURE 2 is an enlarged detailed view of one of the bird house sections showing the internal dividers.

FIGURE 1 shows a base plate 10 of triangular shape. Three holes are formed in plate 10 near the corners and bolts 11, 12, and 13 extend therethrough. Bolts 11 and 12 are short and are formed with eyes through which a rod 14 extends. A pair of anchor bars 16 and 17 have eyes through which rod 14 extends. Suitable holding means, as for example cotter keys, to hold the rod 14 in place. Nuts are threadedly received on bolts 11, 12 and 13 above and below plate 10. Bolt 13 is relatively long and has an end which terminates at about the same level as bars 16 and 17. The lower ends of bolt 13 and bars 16 and 17 are bent to form a firm unit when mounted in concrete, for example.

Bolts 11, 12, and 13 have sufficient threading to facilitate leveling and plumbing of the complete assembly, through adjustment of the nuts above and below plate 10. Also the upper nut of bolt 13 permits the tilting over and lowering of the pipe 18 and its coordinated assembly.

A pipe 18 has its lower end attached to plate 10 by nut 15 and is braced from plate 10 by members 19.

A second pipe 21 has a smaller diameter than pipe 18 and is received therein. A plurality of holes 22 are formed through pipe 18 and a pin 23 extends therethrough to support the lower end of pipe 21 for adjustment of desired elevation of birdhouse proper.

A pipe coupling 24 is attached to the upper end of pipe 21 and a pipe 26 extends upwardly therefrom.

A bird house assembly comprises a pipe 28 with an outwardly flaring end 30 which rests on coupling 24 and serves as the main foundation member of the bird house proper to receive, support and hold all of the members in relation one to the others.

A conical member 27 is made of sheet metal and has a hole at its apex end of a size to allow it to pass over the upper end of pipe 28 and rest on the outwardly flared end of said pipe 28.

A square sheet of material 29 that may be metal, plywood or Masonite, for example, is formed with a central opening through which the pipe 28 extends. The sheet 29 being square is large enough to extend beyond the edge of conical member 27 thereby forming perches at its corners and ledge between said corners.

A cylindrical member 31 rests on plate 29 and is formed with openings 32 for birds to enter and exit. As best shown in FIGURE 2 partitions 33, 34, 36 and 37 are mounted within the cylindrical member 31 and have inner curved ends 38 which interlock about the pipe 28. An opening 32 allows entry into each compartment formed within cylinder 31.

A second sheet 39 is formed with a central opening through which pipe 28 extends and rests on the top of cylindrical member 31.

A second cylindrical member 40 may be mounted above sheet 39 and may have openings 41. Partitions such as those shown in FIGURE 2 may be mounted within the cylindrical member 40.

A circular cover sheet 42 is formed with a central opening and fits over pipe 28 and against member 40.

A top conical member 43 fits over pipe 28 and sheet 42.

A shaft 46 has pins 49 and 50 adjacent its lower end. Pin 50 is detachably received within a mating opening formed in pipe 28. Pin 49 is shorter and serves to attach center shaft 46. A collar 53 is attached to shaft 46 and a conical spring 51 has its upper end against collar 53 and its lower end against conical member 43 thereby pressing the members together between the flared end 50 of pipe 28 and conical member 43 to make a rigid assembly. A cover member 44 of conical shape conceals the spring 51.

A pair of perches 47 and 48 are formed across the top of shaft 46 to give birds a place to perch.

To install the bird house of this invention, bars 13, 16 and 17 may be embedded into concrete. The nut on bar 13 may be removed to allow the plate 10 to disengage the bar 13. The conical member 27, pipe 28, sheet 29, member 31 with partitions, sheet 39, cylindrical member 40 with partitions, plate 42, conical member 43 and shaft 46 with positioned spring 51 are then locked in place. The pin 23 adjusts the relative positions of pipes 21 and 18.

Then the assembly and plate 10 are pivoted upwardly until the bar 13 engages plate 10 and the nut can be threaded onto bar 13 to lock the assembly in the upright position.

It is to be realized that less than or more than two layers of the house can be constructed by merely adding or removing additional cylindrical members and partitions and by varying the length of pipe 28.

The unit makes an attractive and stable bird house that is durable, easy to assemble, and easy to install. It is also easily taken down for cleaning, seasonal storage and replacement in season. Although it has been described with respect to a preferred embodiment, it is not to be so limited as changes and modifications may be made which are within the intended scope as defined by the appended claims.

I claim:

1. A bird house comprising a supporting central pole formed with a shoulder, a conical-shaped bottom member with an opening and received over the supporting pole with the small end down and resting on the shoulder, a flat member formed with a central opening received over the pole and resting against the conical member, a cylindrical member formed with holes receivable over the pole and resting on the flat member, a plurality of partitions within the cylindrical member having inner and outer ends formed with inner curved ends mounted with said ends interlocked about the pole and the outer ends spaced apart and contacting said cylindrical member between said holes to define compartments, a top conical member formed with a central hole received over the pole with the large end down to form a cover, and a locking means engageable with the top conical member and the pole to form a locked unitary assembly.

2. In apparatus according to claim 1, a perch attached to the locking means to allow birds to rest thereon.

3. In apparatus according to claim 1 wherein said locking means comprises a shaft with a pin, an opening formed in the pole for receiving said pin, and a spring loaded member attached to said shaft and in engagement with the top conical member to hold it down and thus lock the bird house structure.

4. In a bird house according to claim 3 a plurality of flat members and cylindrical members alternately supported between the upper and lower conical members to form a multi-storied bird house.

5. In a bird house according to claim 1 a support mast formed with a shoulder and the supporting pole receivable over the mast to rest against the shoulder and pivot means attached to the supporting mast to allow it to be moved from a horizontal to a vertical position.

References Cited in the file of this patent
UNITED STATES PATENTS

| | | |
|---|---|---|
| 1,916,878 | Anklam | July 4, 1933 |
| 2,887,987 | Fitzgerald et al. | May 26, 1959 |
| 2,887,988 | Cottongim | May 26, 1959 |

OTHER REFERENCES

How to Build It, publication, 1936, page 125, Modern Mechanical Pub. Company.

Times-Herald Newspaper, Feb. 17, 1940, page 23.